6641X
O. W. Seely,
Pug Mill.
Patented July 20, 1831.
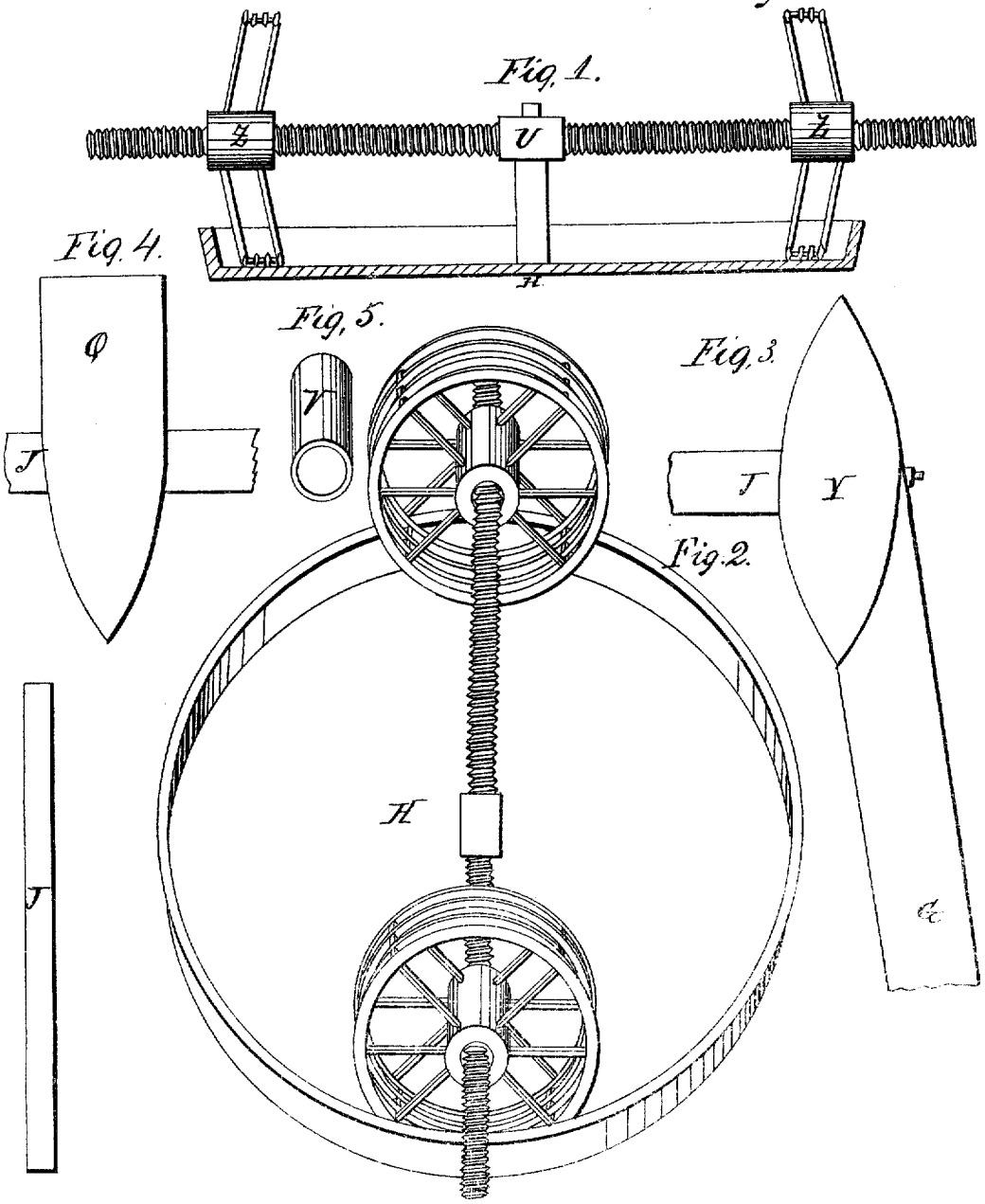
AM. PHOTO-LITHO. CO. N.Y. (OSBORNE'S PROCESS)

66H1X

July 20. 1831

Oran W Seely of Williamson New York

Letters Patent

The Schedule referred to in these Letters Patent and making
part of the same containing a description in the words of the
said Oran W Seely himself of his improvement in the
machine for making and preparing mortar for making Brick Be it known that I Oran W Seely of Williamson in the County of
Wayne and State of New York have invented a new and useful im
provement in the method of preparing mortar for the man
ufacture of brick and other purposes, and that the following
is a full and exact description of the construction and operation
of the said machine as invented or improved by me.
A circular bed is formed of such diameter as may be re
quired, around which is placed a rim or edge; (figure 1. of
the annexed drawing (exhibits a sectional view of the bed with
the machine erected therein, and figure 2. exhibits a perspective
view thereof,) in the centre of the bed is erected an upright
shaft or post on the upper end of which is formed a round
tenon of less diameter than the post so as to form a shoul
der in the post to bear the horizontal shaft or axle on which
it revolves: this horizontal shaft or axle to be made of wood
or iron and of sufficient length as to extend beyond the out
er edge of the bed so far as to admit a pair of horses or
oxen to be attached to it, to put it in motion. On this hor
izontal shaft or axle is cut a screw from each end to within about
four feet of the middle, leaving the middle of the shaft or axle square
about four feet in length. Thro' the square part of the shaft or axle
is a round mortice to receive the tenon on the upright post; the hori
zontal shaft or axle has the screws cut on one end so that when the wheels
hereafter described are placed on it, and put in motion, that both wheels
shall run to the centre at the same time. Two wheels are framed on a long hub with four rims or fellows to each wheel. each rim or fellow
separate from the other and supported by spokes diverging from the
hub and with an inclination to the centre of the bed, or the outer
rims are thus supported and the inner ones are connected and sup
ported by bars mortised thro' them into the outer rims or fellows -
the hubs are cut with a screw so as to form a nut which shall
work on the horizontal shaft or axle - these wheels are formed of iron,
or wood; or partly of iron and partly of wood. the fellows thereof on the
outer edge of the wheel are thick in the middle, and running to an
edge on the inner and outer parts thereof (as in figure 3.) the inner
fellows are flat on their outer edge; and gradually tapered off to an
edge on the inner part (as in figure 4) to the hub on the end next
the upright shaft, or post, is attached a tube of sheet iron of suf-
ficient diameter to go over the horizontal shaft or axle and so long
as to prevent the mortar raised by the wheel from dropping on to the
shaft or axle. these wheels are placed on the shaft or axle at the outer
edge of the bed and horse or ox power is then placed at the ends
of the horizontal shaft. The machine thus put in motion the wheels
will work from the outer part of the bed, when the power will be
reversed and they will work from the centre to the edge, and every
revolution of the axle will cause the wheels to pass through the mor
tar in different places, and at every revolution will cut and press the
mortar so as to fully mix and work it, in a more effectual man-
ner, and in much less time than can be done in any other manner;
thus making a saving of time and labour in the preparation of mortar
for brick and other purposes. In this machine I only claim as my
Invention the improvement in the construction of the wheels as thus de
scribed. and the cutting of the screw so that the said wheels shall both
work from the outer edge of the bed to the centre thereof, and from the
centre to the outer edge at the same time: as they may be placed on the
shaft or axle Witnesses { Robert Alsop
Charles C. Richards Oren W. Seely

[illegible]

(Patented [illegible] July [illegible])